United States Patent [19]

Okatani et al.

[11] Patent Number: 6,075,519

[45] Date of Patent: *Jun. 13, 2000

[54] OPERATIONAL MODE SETTING APPARATUS FOR DISPLAY SCREEN

[75] Inventors: Toru Okatani, Kyoto; Goro Tsutsumidani; Hirohisa Miyamoyo, both of Kobe, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/692,615

[22] Filed: Aug. 6, 1996

Related U.S. Application Data

[63] Continuation of application No. 08/286,278, Aug. 5, 1994, abandoned.

[30] Foreign Application Priority Data

Aug. 6, 1993 [JP] Japan .................................. 5-196236

[51] Int. Cl.[7] ...................................................... G09G 5/00
[52] U.S. Cl. ............................................ 345/173; 345/356
[58] Field of Search ..................................... 345/173, 174, 345/175, 179, 180, 189, 156, 902, 146, 119, 120, 352, 353, 354, 356, 357; 355/313, 209, 200, 202; 341/22, 23; 395/156, 157, 160, 159

[56] References Cited

U.S. PATENT DOCUMENTS

| | | | |
|---|---|---|---|
| 4,682,158 | 7/1987 | Ito et al. . | |
| 4,763,356 | 8/1988 | Day, Jr. et al. | 345/173 |
| 4,896,223 | 1/1990 | Todome | 345/173 |
| 4,970,549 | 11/1990 | Yoshizuka et al. | 355/209 |
| 5,061,958 | 10/1991 | Bunker et al. | 355/209 |
| 5,235,509 | 8/1993 | Mueller et al. | 345/173 |
| 5,406,307 | 4/1995 | Hirayama et al. | 345/179 |

FOREIGN PATENT DOCUMENTS

| | | |
|---|---|---|
| 58-200330 | 11/1983 | Japan . |
| 0349526 | 12/1992 | Japan . |
| 2130837A | 6/1984 | United Kingdom . |

OTHER PUBLICATIONS

Microsoft Windows 3.1, Step by Step, pp. 59, 82–85, 1992.

*Primary Examiner*—Chanh Nguyen
*Attorney, Agent, or Firm*—Sidley & Austin

[57] ABSTRACT

A mode setting apparatus selectively displays one of a plurality of mode setting screens on a display, each of which prompts a user to set a function corresponding to each mode. The mode setting apparatus displays the mode setting screen in a predetermined order in response to a first operation and a medium screen in response to a second operation on condition that any mode setting screen is displayed on the display. The mode setting apparatus changes the medium screen into the desired mode setting screen directly in response to a third operation.

26 Claims, 14 Drawing Sheets

FIG.10 reversed modes are selected.
press the mode to be changed.
press mode check key to resume initial screen.

| paper size auto | paper saving | | X/Y zoom | | | |
|---|---|---|---|---|---|---|
| zoom × 1.000 | margin right shift 5mm | | neg. pos. rev. | | | |
| letters | erase | | mirror image | | | |
| exp. auto | cover | | multi-page enlarge | | | |
| sort | book copy | | image repeat | | | |
| 1 sided > 1 sided | booklet creation | | image outline | | | |

FIG.11

| select mode to set | | | |
|---|---|---|---|
| copy mode | | | |
| paper size | paper saving | X/Y zoom | |
| zoom | file margin | neg.⇌pos. rev. | |
| image type | erase | mirror image | |
| exposure | cover | multi-page enlarge | |
| finishing | book copy | image repeat | |
| orig.→copy | booklet creation | image outline | |
| user choice | | | |
| priority paper size | priority image type | priority orig.→copy | |
| priority zoom | priority exposure | priority multi-page enlarge | |

OPERATIONAL MODE SETTING APPARATUS FOR DISPLAY SCREEN

This application is a continuation of application Ser. No. 08/286,278, filed Aug. 5, 1994 now abandoned.

BACKGROUND OF THE INVENTION

1. Field of the Invention

The present invention relates to mode setting apparatus, and more particularly to mode setting apparatus, such as copying machines, printers and facsimile apparatus, which are adapted to set a desired mode as slected from among a plurality of modes using mode setting screens of hierarchical structure.

2. Description of the Related Art

A liquid crystal display, CRT or the like is used in the operation panels of copying machines which are one type of conventional mode setting apparatus to give the panel apparent simplicity and improved operability. The operation panel is adapted to present items of information in time series on the liquid crystal display, or like display device, to enable the user to select different items using a key. This serves to reduce the number of keys on the operation panel. Furthermore, various sentences and messages can also be presented on the display device, which therefore enables the user to readily understand methods of manipulation and instructions as to modes.

The conventional mode setting apparatus described is limited in the number of keys assigned to the selection items in view of the installation space. The restrictions to the size of display screen of the display device, the clarity of the display screen, etc. impose limitations on the information to be displayed on one screen. Accordingly, when a plurality of modes are to be set, the modes need to be classified into a hierarchical structure and displayed hierarchically. When the hierarchical structure is used for setting an increased number of modes, a plurality of mode setting screens are to be provided between the mode setting screen at a high level and those at a low level. Consequently, the user is unable to identify the mode setting screen of a particular stratum in which the mode to be set is present, and also to understand how to manipulate keys to select the desired mode, hence arises the present problem of the user failing to readily set the desired mode.

Conventional apparatus further have the problem that when a mode setting screen at a low level is to be changed to a mode setting screen at a low level in a different stratum, it is necessary to follow the hierarchical order first upward to the mode setting screen at the top stratum and then follow the order downward to the contemplated mode setting screen in the desired stratum.

Further, when a plurality of modes are to be set, another problem is encountered in that the hierarchical order must be followed upward and downward to a particular mode setting screen for each of these modes.

Further, when a help screen is to be changed to a mode setting screen corresponding to the help, mode setting screens need to be traced from stratum to stratum although the user is aware what mode setting screen is to be displayed.

SUMMARY OF THE INVENTION

An object of the present invention is to provide a mode setting apparatus which can be manipulated by a simplified procedure to readily set a desired mode.

Another object of the invention is to provide a mode setting apparatus wherein when a mode setting screen at a low level is to be changed to a mode setting screen at a low level in a different stratum, the changeover to the desired mode setting screen can be accomplished directly using a medium screen.

Another object of the invention is to provide a mode setting apparatus wherein when a plurality of modes are to be set, mode setting screens corresponding to these modes are displayed in succession.

Another object of the present invention is to provide a mode setting apparatus wherein a help screen can be changed directly to a mode setting screen corresponding to the help screen.

With the mode setting apparatus of the present invention, a desired mode setting screen can be directly selected using a medium screen, and the desired mode can be set with use of the selected mode setting screen.

Further in the case where a mode setting screen at a low level is to be changed to a mode setting screen at a low level in a different stratum, the change to the desired mode setting screen can be accomplished directly using a medium screen, allowing the desired mode to be set.

A plurality of modes can be selected using the medium screen.

A help screen can be changed over directly to a mode setting screen corresponding to the help screen, whereby the desired mode can be set.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 10 is a diagram showing an example of mode check screen;

FIG. 11 is a diagram showing an example of index screen;

DESCRIPTION OF THE PREFERRED EMBODIMENTS

Figure 1:
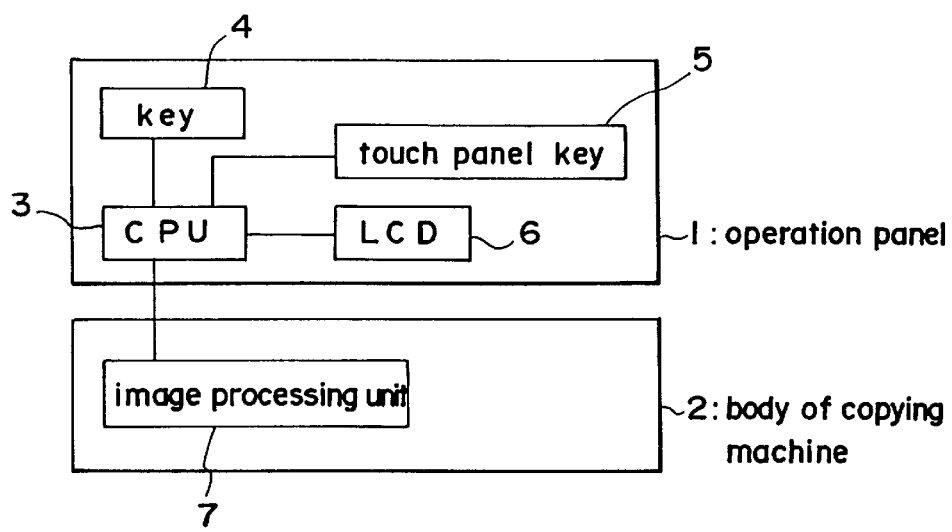
FIG. 1 is a diagram showing the construction of a mode setting apparatus embodying the present invention.

A copying machine which has a mode setting apparatus embodying the invention will be described next with reference to the drawings. FIG. 1 is a block diagram showing the construction of the copying machine.

Referring to FIG. 1, the copying machine includes an operation panel 1, and the body 2 of the copying machine. The operation panel 1 includes a CPU (central processing unit) 3, key arrangement 4, touch panel key arrangement 5 and LCD (liquid crystal display) 6. The machine body 2 includes an image processing unit 7.

The user manipulates the key arrangement 4 or touch panel key arrangement 5 to set a desired mode setting screen as displayed on the LCD 6, and sets a desired mode using the setting screen. The CPU 3 identifies the input signal from the key arrangement 4 or touch key arrangement 5 to display a specified mode setting screen on the LCD 6 or controls the operation of the image processing unit 7.

Figure 2:
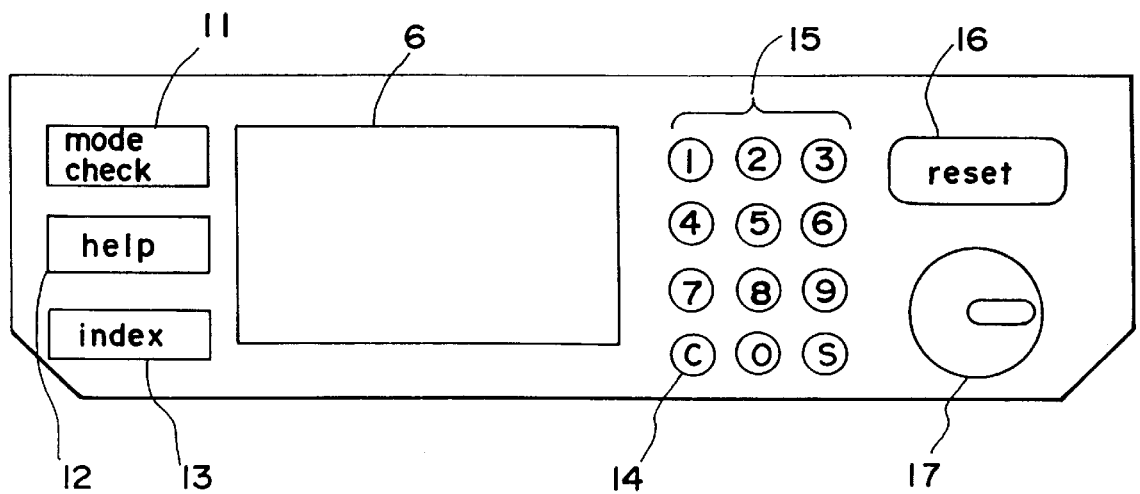
FIG. 2 is a diagram showing the appearance of an operation panel shown in FIG. 1.

The operation panel 1 will be described next in detail with reference to the drawing concerned. FIG. 2 is a diagram showing the construction of the operation panel 1.

The operation panel 1 includes a mode check key 11, help key 12, index key 13, clear key 14, number entry keys 15, panel reset key 16, and start/stop key 17.

The mode check key 11 is a key for displaying a mode check screen for showing a list of all modes currently set. The help key 12 is a key for displaying a help screen for showing instructions as to the mode provided for the apparatus. The index key 13 is a key for displaying an index screen showing a list of modes which can be utilized by the user. The number entry keys 15 and the clear key 14 are used for inputting, for example, the number of sheets or a magnification, or for correcting the input. The panel reset key 16 is a key for canceling all set modes. The start/stop key 17 is a key for starting or stopping a copying operation. The touch panel key arrangement 5 is provided on the surface of the LCD 6 for enabling the user to give a desired input by directly touching the screen displayed.

Figure 3:
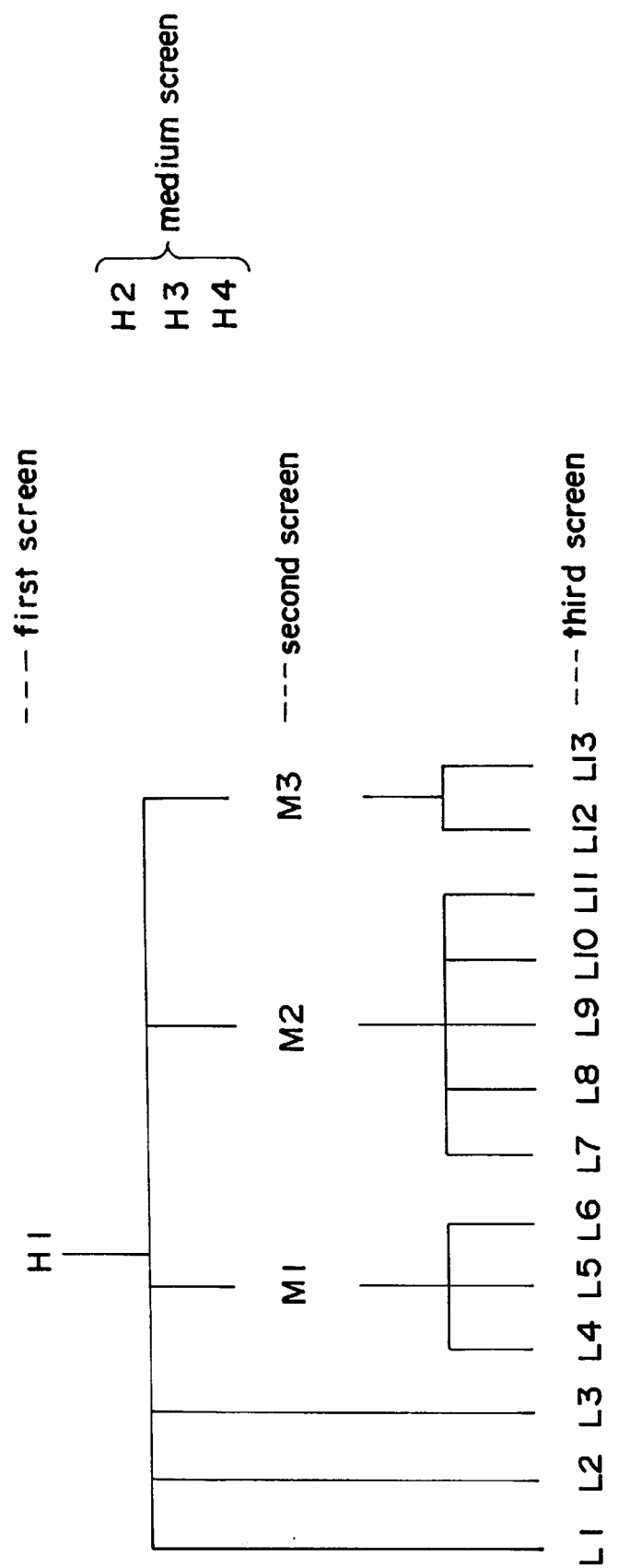
FIG. 3 is a diagram for illustrating display screens classified into a hierarchical structure.

A description will be given next of display screens corresponding to the respective modes provided for the copying machine. The modes of the copying machine are hierarchically divided according to what they are, and the display screens for the respective modes are also hierarchically divided. FIG. 3 is a diagram showing the hierarchical structure of display screens.

As shown in FIG. 3, the display screens are hierarchically divided into three strata, i.e., a first screen, second screens and third screens. A basic screen H1 is provided as the first screen. The second screens are a filing screen M1, create screen M2 and finishing screen M3. Provided as the third screens are a paper size screen L1, zoom screen L2, exposure screen L3, file margin screen L4, erase screen L5, book copy screen L6, X/Y zoom screen L7, negative-positive reversal screen L8, mirror image screen L9, multi-page enlarge screen L10, image outline screen L11, sort screen L12 and staple screen L13.

The third screens correspond to the following respective modes. The paper size screen L1 is used for setting a paper size mode in which the size of copy paper is specified. The zoom screen L2 is used for setting a zoom mode in which a magnification is specified at which documents are to be copied. The exposure screen L3 is used for setting an exposure mode in which the density of copies is specified. The file margin screen L4 is used for setting a file margin mode in which copies are made with a blank area provided for filing. The erase screen L5 is used for setting an erase mode in which documents are copied as masked over a specified area measured from one end. The book copy screen L6 is used for setting a book copy mode in which whether a book used as an original is to be opened rightward or leftward is specified. The X/Y zoom screen L7 is used for setting an X/Y zoom mode in which documents are copied at different magnifications in the X and Y directions. The negative-positive reversal screen L8 is used for setting a negative-positive reversal mode in which documents are copied with the negative and positive areas thereof reversed. The mirror image screen L9 is used for setting a mirror image mode in which mirror-image copies of documents are produced. The multi-page enlarge screen L10 is used for setting a multi-page enlarge mode in which documents are copied each as divided into a plurality of sheets and as enlarged to the size of specified paper, on a specified scale or to a specified size. The image outline screen L11 is used for setting an image outline mode in which only the outlines of document images are extracted and copied. The sort screen L12 is used for setting a sort mode in which copy sheets are discharged as sorted. The staple screen L13 is used for setting a staple mode in which copy sheets are discharged as stapled.

The mode setting screens described above are examples; other mode setting screens may be used additionally. The hierarchical structure need not be limited to a three-stratum structure but can be other structure.

Besides the mode setting screens described, a mode check screen H2, help screen H3 and index screen H4 are used as medium screens according to the present embodiment. More specifically, the mode check screen H2, help screen H3 or index screen H4 can be changed over directly to the desired one of the mode setting screens. Accordingly, the user can cause the LCD to directly display the desired mode setting screen by directly pressing the mode check key 11, help key 12 or index key 13 shown in FIG. 2 and selecting the desired mode setting screen with use of the medium screen instead of resorting to the mode setting method in conformity with the usual hierarchical structure, whereby the desired mode can be directly set. The medium screen may be a screen which is provided for another purpose as in the present embodiment, or may be a medium screen additionally provided specifically for use as such.

Figure 4:
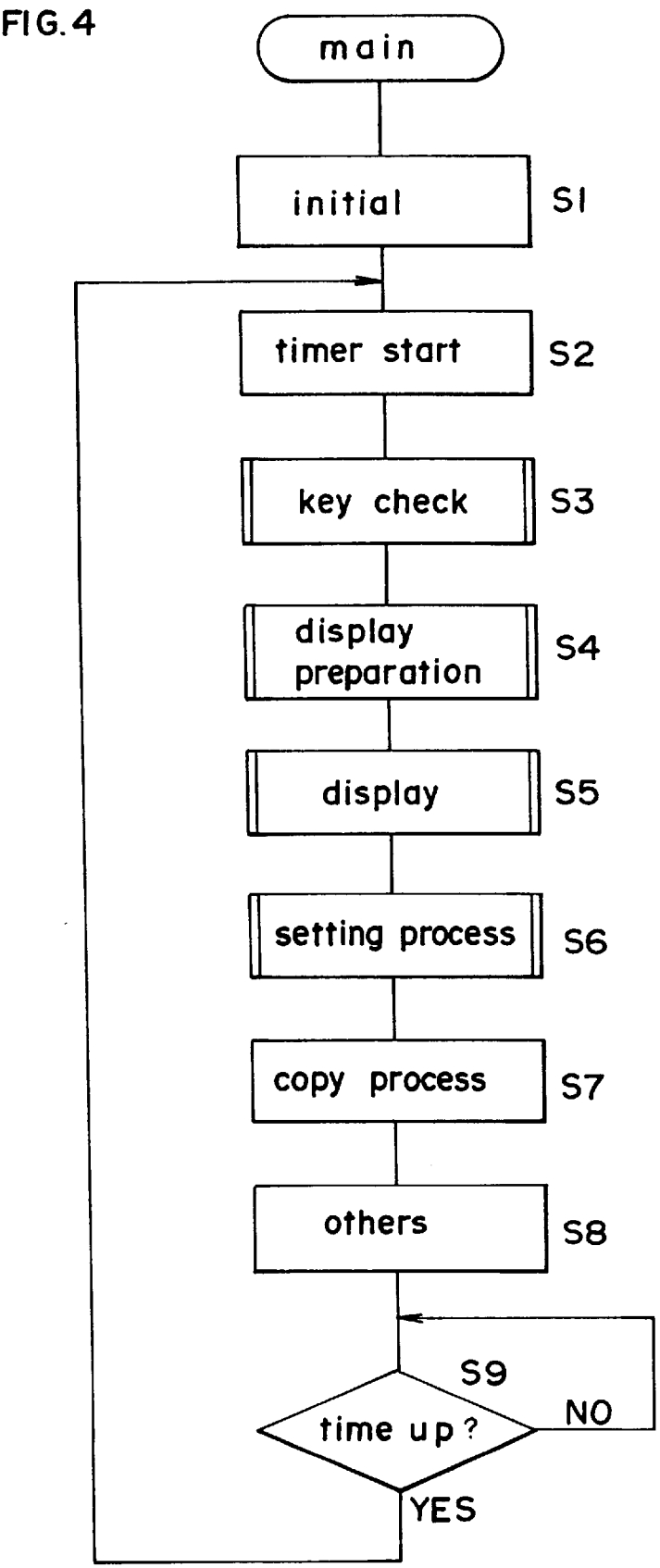
FIG. 4 is a flow chart illustrating the main routine to be executed by the mode setting apparatus shown in FIG. 1.

Next, the operation of the mode setting apparatus of the present embodiment will be described. FIG. 4 is a flow chart illustrating the main routine to be executed by the present apparatus. The flow chart shown in FIG. 4 is stored in advance in a memory (not shown) within the CPU 3 of FIG. 1, and is read out as required by the CPU 3 for execution.

When the power supply for the machine body 2 is turned on, the CPU 3 initializes various devices and displays the basic screen H1 in step S1.

Next in step S2, the CPU 3 starts an internal timer to measure time. In the case where the time measurement is found to be in excess of a predetermined period of time in step S9 after the processes to be described below have been practiced, the sequence returns to step S2 for the execution of the same processes again. Thus, the flow chart shows a cyclic program. Accordingly, the processes to be described below are not always executed in time series but the state of execution differs with the time setting.

Figure 5:
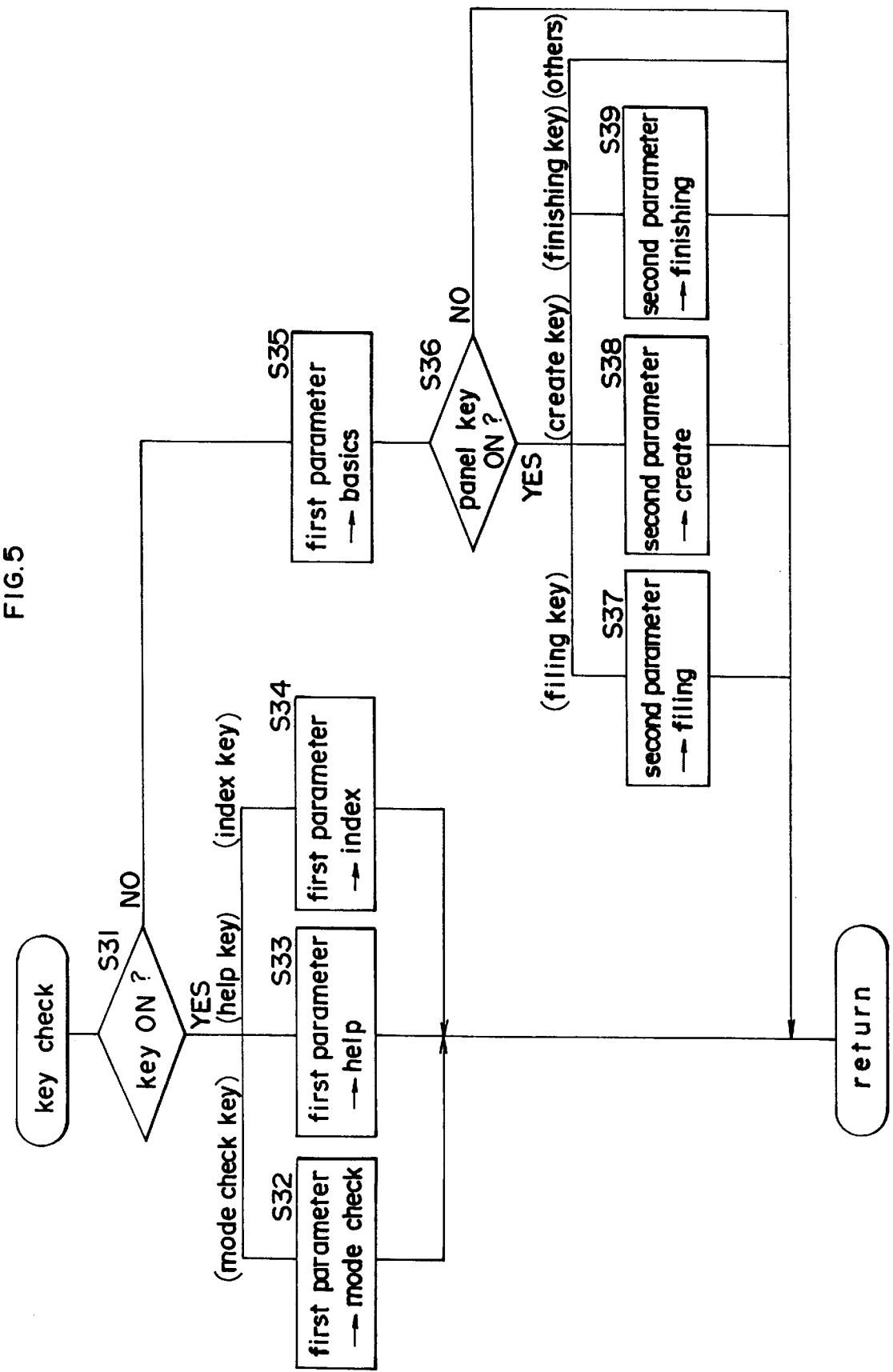
FIG. 5 is a flow chart illustrating a key check process shown in FIG. 4.

Step S3 is a key check process, which will be described next in reference to FIG. 5, which is a flow chart illustrating the key check process.

First, an inquiry is made as to whether a key input has been given in step S31. The term "key" thus used refers to the mode check key 11, help key 12 or index key 13. Step S31 is followed by step S32 if the key is identified as the mode check key 11, or by step S33 if it is found to be the help key 12, or by step S34 if it is found to be the index key 13. When the inquiry is answered in the negative, step S35 follows.

In steps S32 to S34, the mode check screen, help screen and index screen are set, respectively, as a specified first parameter, and the sequence returns to the main routine of FIG. 4.

In the absence of key input, on the other hand, the basic screen is set as the first parameter in step S35.

Subsequently in step S36, an inquiry is made as to whether a panel key has been depressed. The term "panel key" refers to the touch panel key arrangement 5 provided on the LCD 6, and the inquiry checks whether the user has pressed a specified key on the screen using the key arrangement 5. Step S36 is followed by step S37 when a filing key is pressed for displaying the corresponding second screen, or by step S38 when a create key is pressed, or by step S39 when a finishing key is pressed. The sequence returns to the main routine of FIG. 4 in the presence of other key input and in the absence of panel key input.

In steps S37 to S39, the filing screen, create screen and finishing screen are set respectively as a second parameter, and the sequence returns to the main routine shown in FIG. 4.

The first screen or medium screen is set as the first parameter, and the second screen is set as the second parameter by the foregoing key check process.

Figure 6A:
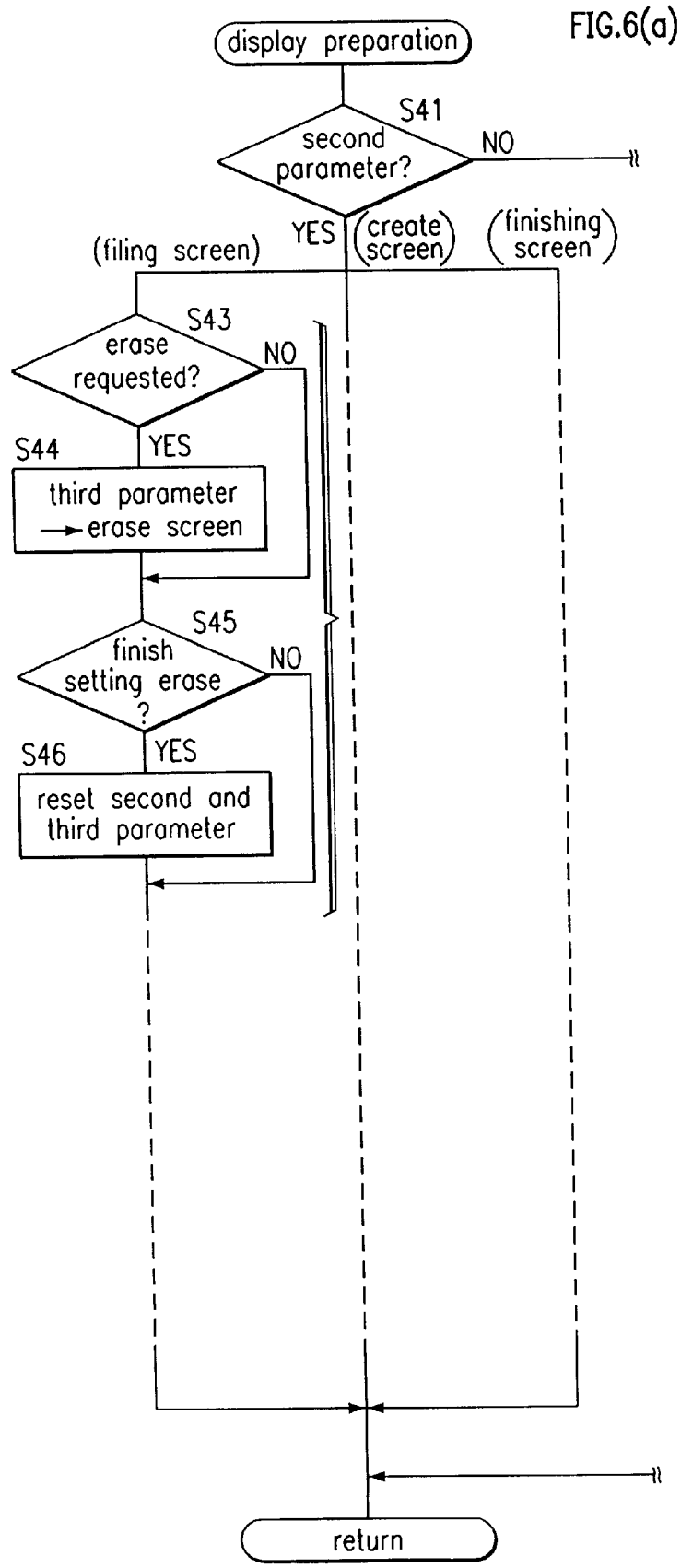
FIGS. 6(a)–6(b) are a flow chart illustrating a display preparation process shown in FIG. 4.
Figure 6B:
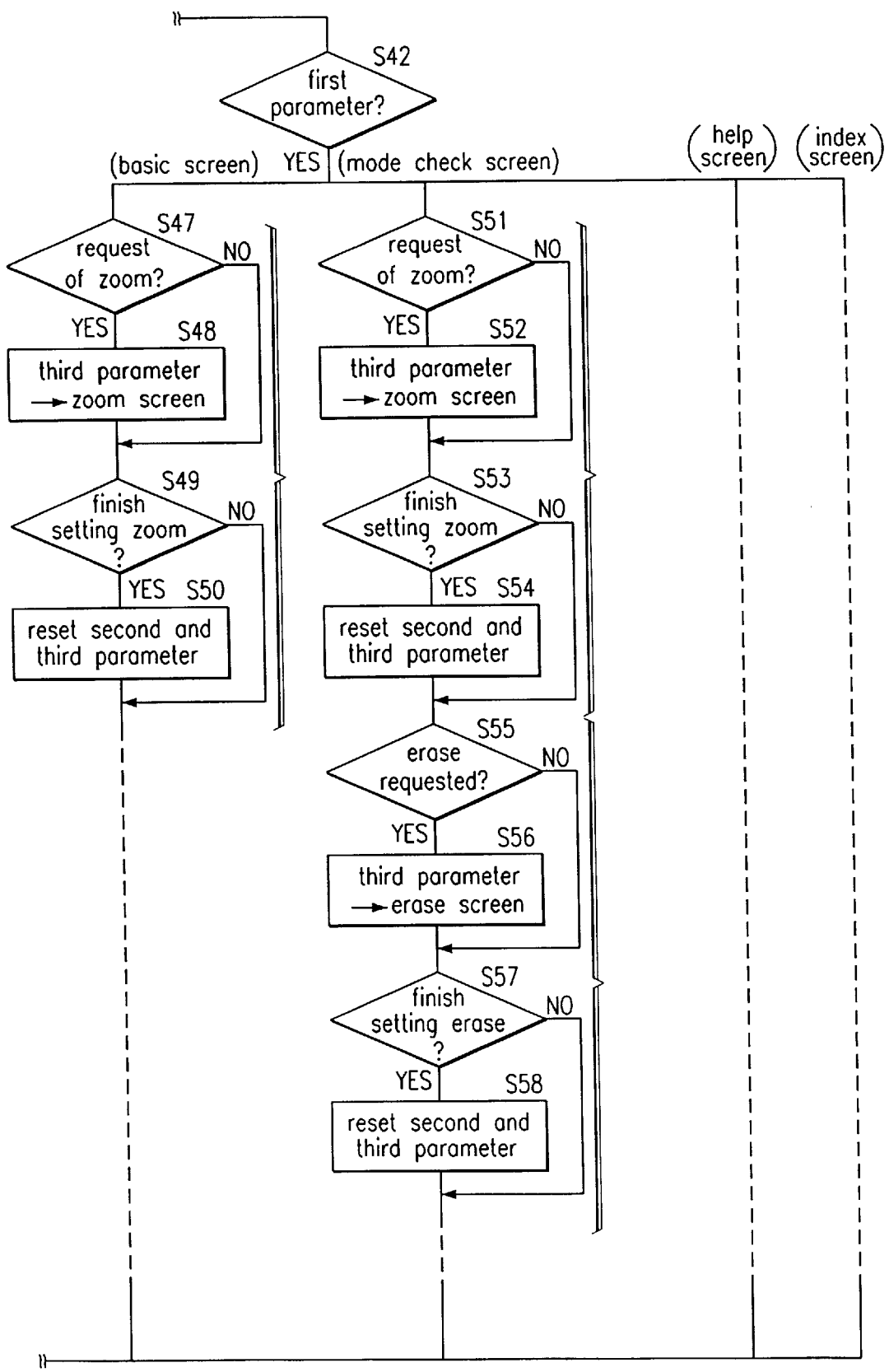

Step S4 of FIG. 4 is a display preparation process, which will now be described in reference to FIGS. 6(a)–6(b), which are a flow chart illustrating the display preparation process.

First in step S41, an inquiry is made as to whether the second parameter has been set. When the answer is negative, step S42 follows. When the answer is affirmative, the following procedure is executed.

In the case where the filing screen is set as the second parameter, the erase mode, for example, is set. More specifically, the user selects the erase mode, and an inquiry is made as to whether erasure is requested in step S43. When the request is made, the erase screen is set as a third parameter in step S44.

If otherwise, step S45 follows.

Next, step S45 checks whether the erase mode has been completely set. When the erase mode has been set, the second and third parameters are reset in step S46. If otherwise, step S46 is skipped. By the procedure described, the erase screen can be set as the third parameter, and the second and third parameters reset after the completion of erase mode setting. The filing screen involves the file margin mode and book copy mode in addition to the erase mode described. The screen for setting each of these modes is set as the third parameter, and the second and third parameters are reset after the mode has been set as in steps S43 to S46, whereupon the sequence returns to the main routine shown in FIG. 4. The procedure for each of these modes includes manipulation by the user, and the manipulation by the user will not be completed within a short period of time, while the main routine is executed cyclically within a specified period of time. It is therefore unlikely that a plurality of mode setting screens will be set in an overlapping relation as the third parameter or that the second and third parameters will be reset before a specified mode screen will be displayed in accordance with the third parameter.

In the case where the second parameter is the create screen, a procedure similar to that of steps S43 to S46 is executed for each of the X/Y zoom screen, negative-positive reversal screen, mirror image screen, multi-page enlarge screen and image outline screen to set a mode setting screen specified by the user as the third parameter and reset the second and third parameters after the completion of mode setting.

A similar procedure is executed also in the case where the second parameter is the finishing screen to set sort mode or staple mode setting screen as the third parameter and reset the second and third parameters after the completion of mode setting.

On the other hand, when the second parameter has not been set an inquiry is made in step S42 as to whether the first parameter has been set. In the case where the first parameter is the basic screen, step S47 to step S50, similar to steps S43 to S46, follow to set the zoom screen as the third parameter and reset the second and third parameters after the completion of zoom mode setting. Other modes of the basic screen, such as paper size mode and exposure mode, are also set similarly.

Further in the case where the first parameter is the mode check screen, step S51 to step S54 follow to set the zoom screen as the third parameter and reset the second and third parameters after the completion of zoom mode setting as in steps S43 to S46. Other modes of the mode check screen, such as erase mode, are set similarly. The same procedure as above is executed also when the first parameter is the help screen or index screen.

Thus, the display preparation process wherein mode setting screens based on a usual hierarchical structure are used sets third screens, i.e., these mode setting screens, as the third parameter. The mode setting screens can also be set directly as the third parameter using a mode check screen, help screen and index screen.

Figure 7:
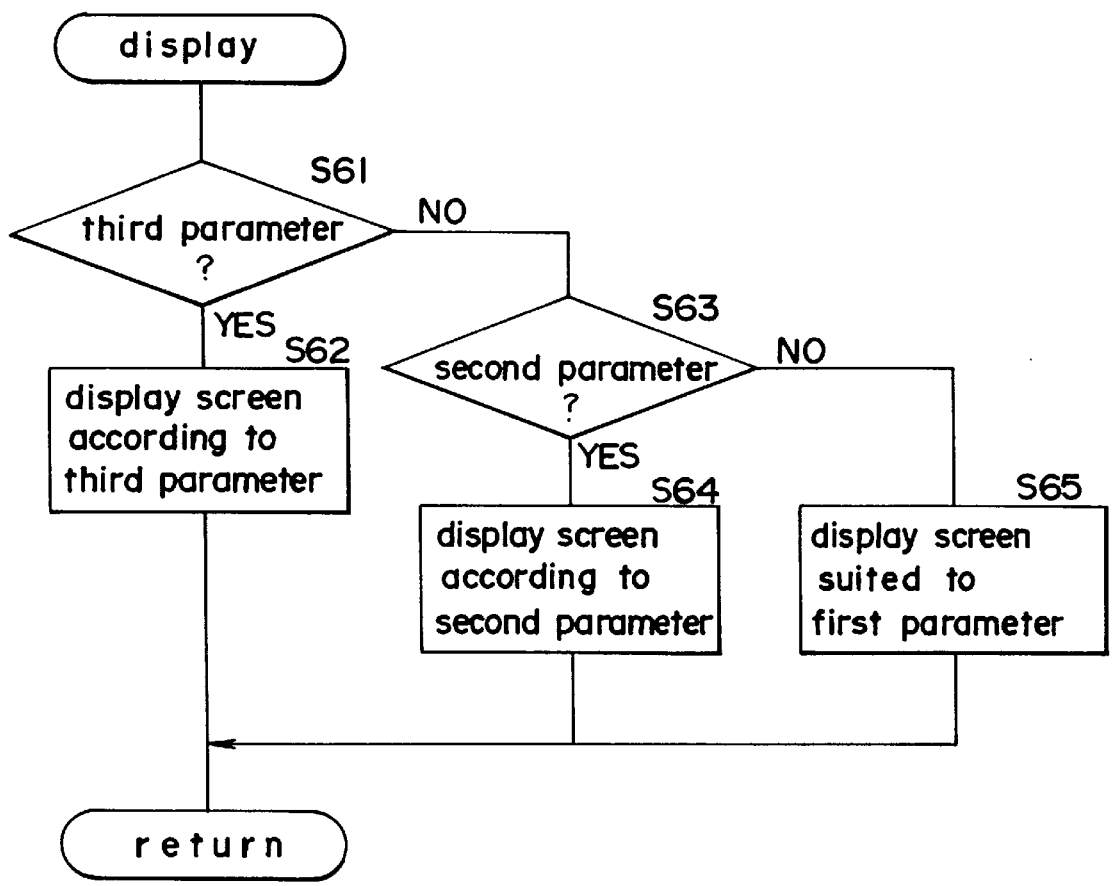
FIGS. 7(a)–7(b) are a flow chart illustrating a display process shown in FIG. 4.

Step S5 of FIG. 4 is a display process, which will be described next with regard to FIG. 7, which is a flow chart illustrating the display process.

First, an inquiry is made in step S61 as to whether the third parameter has been set. When the parameter is set, step S62 follows. If otherwise, step S63 follows.

When the third parameter is set, the mode setting screen set as the third parameter is displayed in step S62.

If the third parameter is not set, on the other hand, an inquiry is made in step S63 as to whether the second parameter has been set. When the answer is affirmative, the second screen set as the second parameter is displayed in step S64. If otherwise, the first screen or medium screen set as the first paremeter is displayed in step S65.

When the third parameter has been set, the third screen, i.e., mode setting screen, set as the third parameter is displayed as described above. Thus, based on the third parameter set by the above display preparation process, the specified mode setting screen can be displayed which enables the user to directly select the desired mode. Further in the case where the third parameter is not set but the second parameter is set, the second screen set as the second parameter is displayed, so that the user can select a third screen below the second screen. Further in the case where the third and second parameters are not set, a screen corresponding to the first parameter is set. Accordingly, when the second and third parameters are reset by the display preparation process of FIG. 6, the basic screen or medium screen set as the first parameter is to be displayed, and upon completion of setting, the original basics screen or medium screen is resumed on the display, so that other mode can further be set easily.

Figure 8:
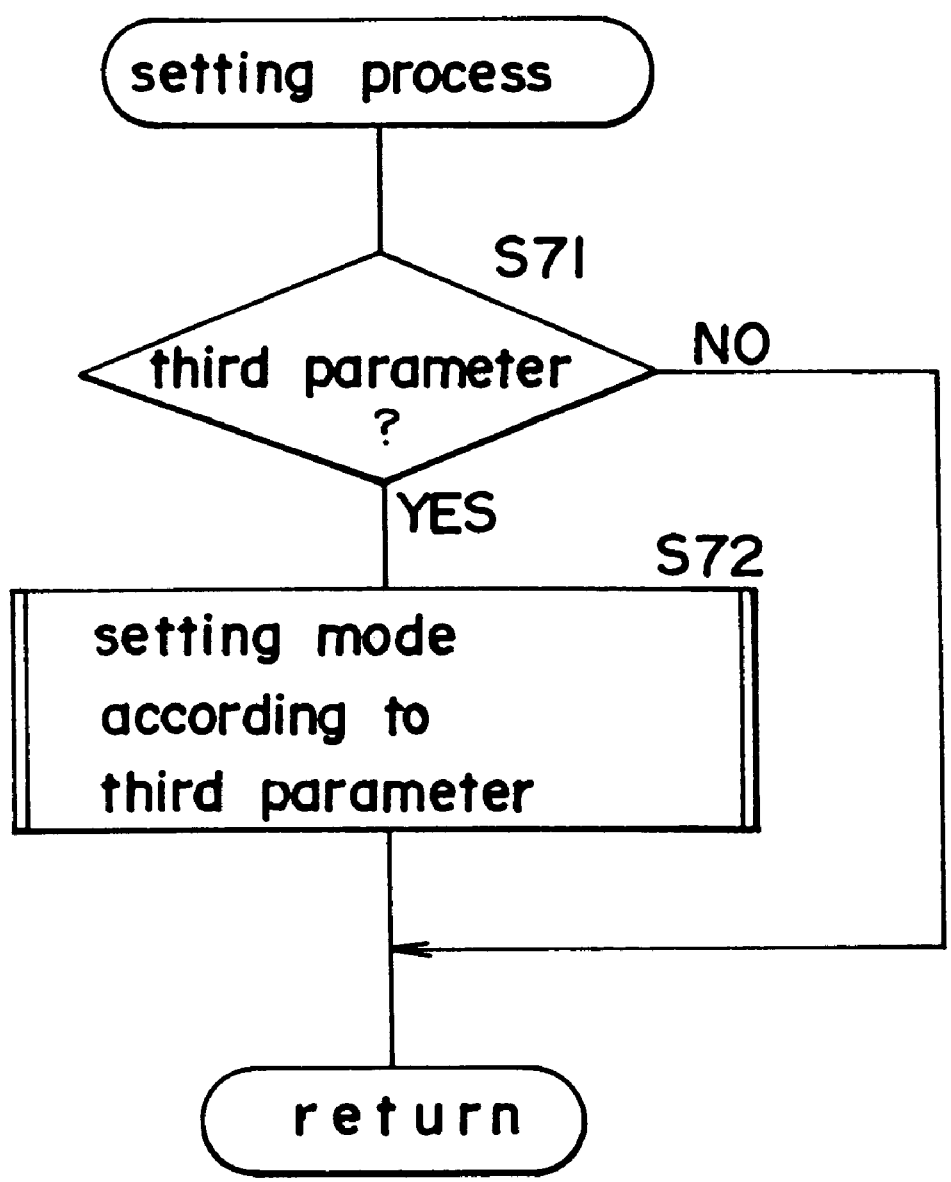
FIG. 8 is a flow chart illustrating a setting process shown in FIG. 4.

Step S6 of FIG. 4 is a setting process, which will be described next with regard to FIG. 8, which is a flow chart illustrating the setting process.

First, an inquiry is made in step S71 as to whether the third parameter has been set. When the answer is affirmative, step S72 follows in which the mode corresponding to the third parameter is set in the machine body 2. When the third parameter is not set, on the other hand, step S72 is skipped, and the sequence returns to the main routine of FIG. 4.

Subsequently, a copying process and other processes are executed in steps S7 and S8, followed by step S9.

An inquiry is made in step S9 as to whether the time measured by the timer set in step S2 is in excess of the predetermined time. When the time measurement is in excess of the predetermined value, step S2 follows again. Step S9 is repeated if otherwise.

Besides mode setting with use of mode setting screens provided by the usual hierarchical structure, a mode check screen, help screen or index screen, each of which is a medium screen, is usable to directly display a desired mode setting screen and set the desired mode.

Figure 9A:
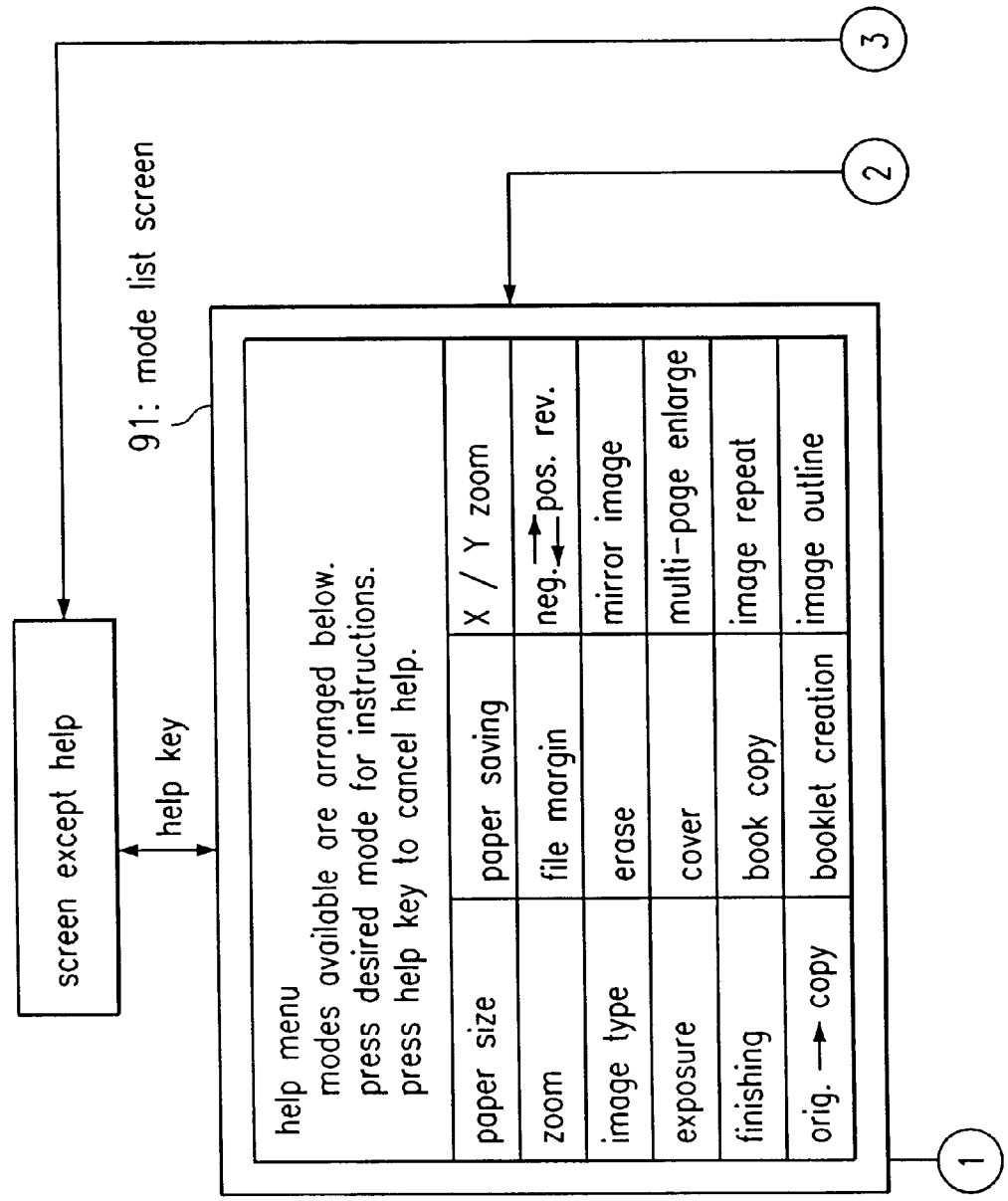
FIG. 9 is a diagram illustrating changes of help screens on display.
Figure 9B:
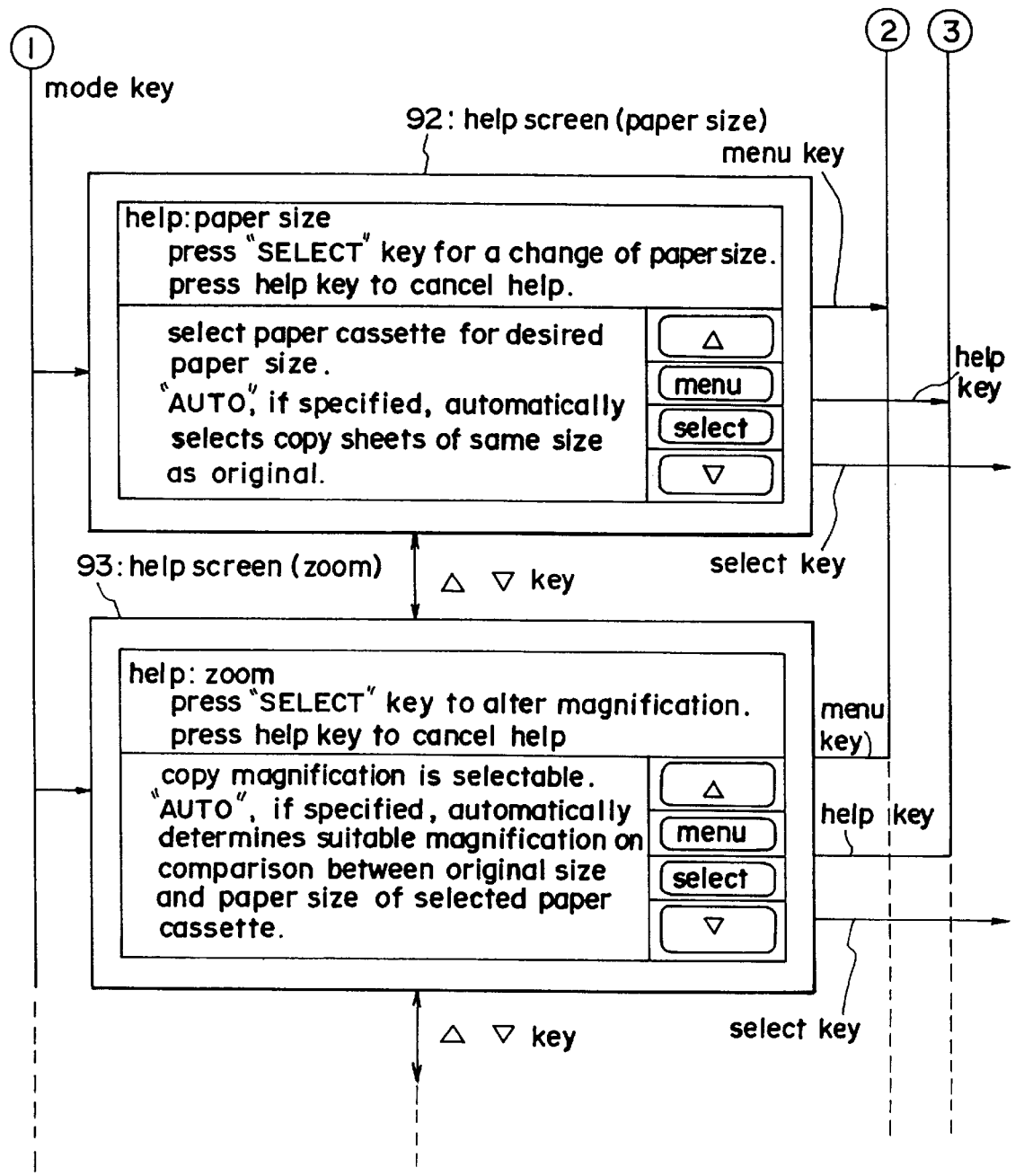

The help screen will be described next. FIGS. 9(a) and 9(b) are diagrams illustrating changes of help screens on display.

With the mode setting apparatus of the present embodiment, a mode list screen 91, which is a help screen, is displayed when the help key 12 shown in FIG. 2 is depressed. The user usually selects a desired mode from the mode list screen 91, whereupon the user can view a mode instruction screen giving instructions as to the mode. For example, when "paper size" is selected, a paper size instruction screen, i.e., help screen (paper size) 92, is displayed. In the case where "zoom" is selected, a zoom instruction screen, i.e., help screen (zoom) 93, is displayed. When the user desires to set the displayed mode at this time, he presses "select" key, whereby a screen for setting the displayed mode is presented. Alternatively, the mode list screen 91 can be resumed by depressing a "menu" key, or depression of "Δ" or "∇" key changes over the current screen to the preceeding or following mode instruction screen. When it is desired to discontinue the procedure with the help screens, the help key 12 shown in FIG. 2 is depressed again, whereby the basic screen can be resumed. Consequently, while reading the instructions as to the desired mode in the usual help mode, the user is able to change over the help screen directly to the corresponding mode setting screen, which enables him to set the desired mode. Thus, the desired mode can be set easily by a simplified manipulation procedure.

Next, the mode check screen will be described. FIG. 10 is a diagram showing an example of mode check screen.

As shown in FIG. 10, selected mode names are indicated by hatching, as distinguished from unselected mode names which remain unhatched. By pressing the mode check key 11 shown in FIG. 2, the user can display the mode check screen as changed over from any display screen. The original screen can be resumed by pressing the mode check key 11 again. Further by selecting a desired mode in the mode check screen with the touch panel key arrangement 5, the screen for setting the selected mode can be displayed upon a change-over. Further with a plurality of modes selected on the mode check screen, the corresponding mode setting screens can be displayed by displaying an optional one of these mode setting screens first, followed by setting of the mode concerned, thereafter displaying another one of the mode setting screens and repeating this procedure. In this way, all the modes selected on the mode check screen can be set.

In the case where the mode check screen is used as a medium screen as described above, the user can set modes while recognizing the current setting and will not be perplexed with the method of manipulation, which is a great convenience. Since the mode check screen can be changed over to a desired mode setting screen, the manual procedure needed is definite and is always less than the usual method of manipulation. The desired mode can therefore be set easily by a simplified procedure.

The index screen will be described next. FIG. 11 is a diagram showing an example of the index screen. The index screen is displayed to show a list of modes available to the user as shown in FIG. 11. Since the index screen can be changed over to a desired mode setting screen, the desired mode can be set easily by a simplified manual procedure.

Although desired keys on the display screen is settable with use of the selected mode setting screen. Accordingly, the desired mode can be set easily by a simplified manipulation procedure.

Further in the case where a mode setting screen at a low level is to be changed over to a mode setting screen of low level in a different stratum, the change-over to the desired mode setting screen can be accomplished directly using a medium screen. The mode of different stratum can therefore be set with ease.

The medium screen is further usable for selecting a plurality of modes, which can therefore be set easily.

The help screen can be changed over directly to a mode setting screen corresponding to the help screen to set the desired mode, so that the mode corresponding to the help screen can be set with ease.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

Finally, changes of screens will be explained in detail hereinafter by giving an example that a user sets the sort mode.

Figure 12:
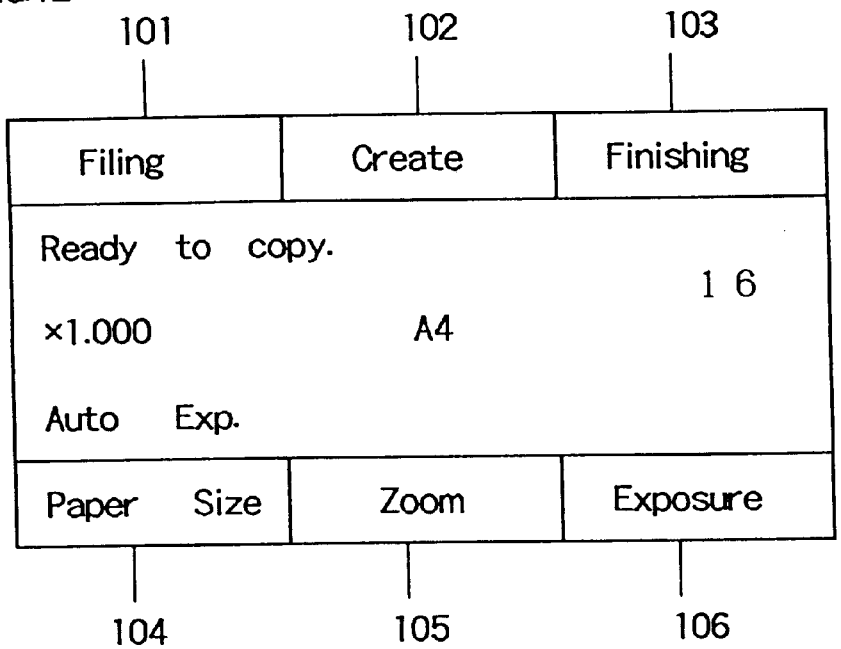
FIG. 12 is a diagram showing an example of basic screen.

When the power supply for the machine body 2 is turned on, the basic screen H1 as shown in FIG. 12 is displayed on the LCD 6. Touch panel key arrangement 5 is provided on the basic screen H1 on the LCD 6. When filing key 101 is touched, the basic screen H1 changes into the filing screen M1. Similarly, the basic screen H1 changes into the create screen M2 in response to touch of create key 102, and changes into the finishing screen M3 in response to touch of finishing key 103. Further, the basic screen H1 changes into the paper size screen L1 in response to touch of paper size key 104, changes into the zoom screen L2 in response to touch of zoom key 105, and changes into the exposure screen L3 in response to touch of exposure key 106.

Figure 13:
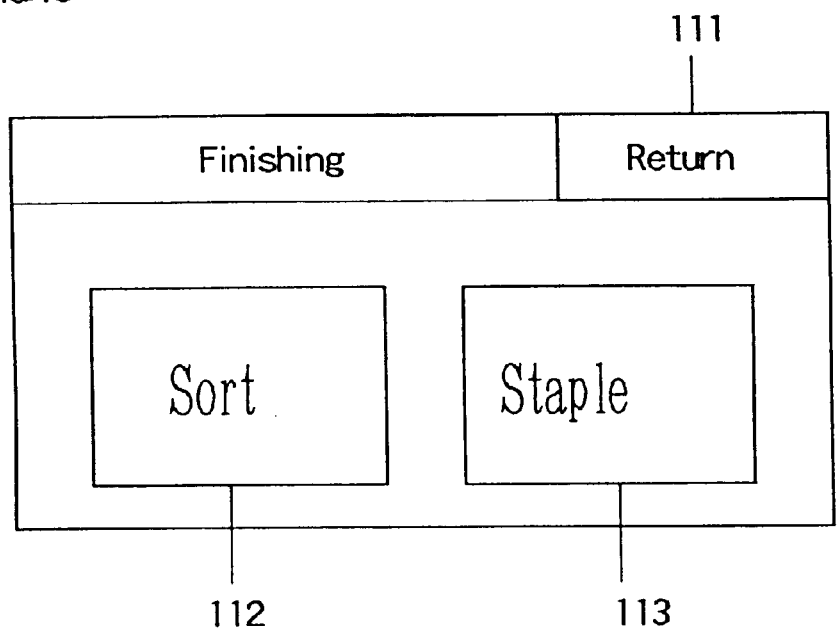
FIG. 13 is a diagram showing an example of filing screen.

The sort mode belongs to "finishing", therefore the user touches the finishing key 103 on the basic screen H1. Then, the basic screen H1 changes into the finishing screen M3 as shown in FIG. 13 as a second screen. The touch panel key arrangement 5 is also provided on the surface of the finishing screen M3. When sort key 112 is touched, the finishing screen M3 changes into sort screen L12. When staple key 113 is touched, the finishing screen M3 changes into the staple screen L13. Further, the finishing screen M3 returns to the basic screen HI by touch of return key 111.

Figure 14:
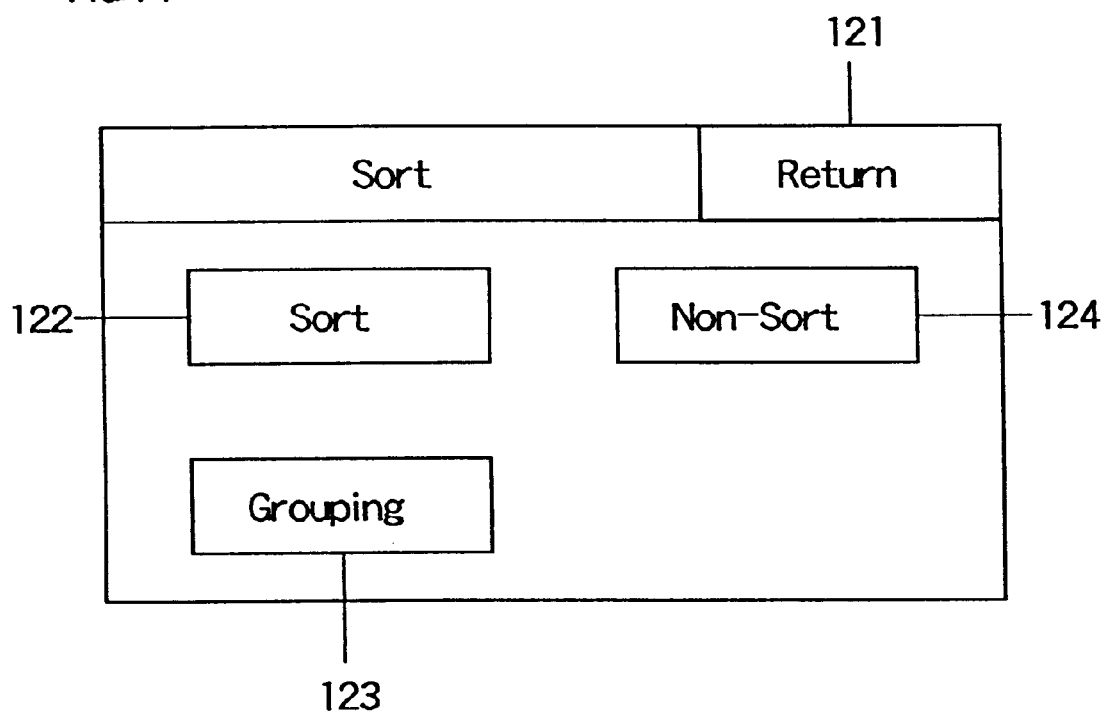
FIG. 14 is a diagram showing an example of sort screen.

When the user selects the sort mode, the finishing screen M3 changes into the sort screen L12 as shown in FIG. 14. The touch panel key arrangement 5 is also provided on the surface of the sort screen L12, therefore a function of the sort mode is set in response to touch of the touch panel key. For example, usual sort is set by touch of sort key 122, grouping sort, which sorts copies according to each original is set by touch of grouping key 123. In this way the user can set the desired function of sort mode by a touch of the touch panel key on condition that the sort screen L12 is displayed on the LCD 6. Moreover the user can cancel the function of sort mode which has been once set by a touch of non-sort key 124. Further, the sort screen L12 returns to the finishing screen M3 by touch or return key 121.

Furthermore, when the user does not know which second screen the sort mode belongs to on condition that the basic screen H1 is displayed on the LCD 6, or the user wants to change the screen directly from the basic screen H1 into the sort screen L12, the user presses index key 13. Then the index screen H4 as shown in FIG. 11 is displayed on the LCD 6. The user selects the sort mode on the index screen H4. In response to the selection of the sort mode, the index screen H4 changes directly into the sort screen L12. The user can set the desired function of the sort mode by a touch of the touch panel key on condition that the sort screen L12 is displayed on the LCD 6.

Changes of screens will be explained in detail in case of where a plurality of modes are selected on the index screen H4 by giving an example that the user sets the file margin mode and the sort mode. The user selects the file margin mode and the sort mode on condition that the index screen H4 is displayed on the LCD 6, and the index screen H4 changes into the file margin screen L4. The user sets a direction or margin, a way or making file margin (shift or reduction), and a size of file margin. When the user finishes setting the function of file margin mode, the file margin screen L4 changes into the sort screen L12. The user can set a desired function of sort mode by touch of the touch panel key on condition that the sort, screen L12 is displayed on the LCD 6.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mode setting apparatus, comprising:
   a switch device;
   a plurality of mode setting screens each of which prompts a user to set a function corresponding to each mode, said mode setting screens being arranged in a hierarchical structure;
   a mode list screen which lists each one of the plurality of mode setting screens, said mode list screen being independent of the hierarchical structure;
   a display for displaying said mode setting screens and said mode list screen, said display displaying only one screen at a time, said one screen being a screen selected from said plurality of mode setting screens and said mode list screen; and
   a display controller which displays one of said plurality of mode setting screens on the display according to the hierarchical structure in response to a first operation of the switch device, said first operation of said switch device causing said display controller to change a displayed screen from a first mode setting screen to a mode setting screen that is hierarchically adjacent to said first mode setting screen,
   said display controller displaying said mode list screen on the display in response to a second operation of the switch device, said second operation of said switch device causing said display controller to chance a displayed screen to said mode setting screen without regard to the hierarchical structure,
   and said display controller further displaying, when a mode setting screen is selected on the mode list screen, the specific mode setting screen selected.

2. A mode setting apparatus as claimed in claim 1, wherein the plurality of mode setting screens are hierarchically divided into three strata.

3. A mode setting apparatus as claimed in claim 2, wherein the mode setting screen displayed by the display controller is the lowest hierarchy in response to the third operation of the switch device.

4. A mode setting apparatus as claimed in claim 1, wherein the plurality of mode setting screens are divided into a plurality of groups.

5. A mode setting apparatus as claimed in claim 4, wherein the mode list screen indicates a list of mode setting screens which belong to at least groups other than the group to which the mode setting screen displayed prior to the second operation of the switch device belongs.

6. A mode setting apparatus as claimed in claim 4, wherein the number of strata divided hierarchically varies on each of the groups.

7. A mode setting apparatus as claimed in claim 1, wherein the mode list screen also indicates a setting condition of each mode.

8. A mode setting apparatus as claimed in claim 1, wherein the mode list screen indicates a list of all modes available to the user.

9. A mode setting apparatus, comprising:
   a plurality of mode setting screens each of which prompts a user to set a function corresponding to each mode, said mode setting screens being arranged in a hierarchical structure;
   a mode list screen which lists each one of the plurality of mode setting screens, said mode list screen being independent of the hierarchical structure;
   a display for displaying said mode setting screens and said mode list screen, said display displaying only one screen at a time, said one screen being selected from said plurality of mode setting screens and said mode list screen;
   first displaying means for sequentially displaying one of said plurality of mode setting screens on the display according to the hierarchical structure in response to a first manual operation, said first displaying means chancing a displayed screen from a first mode setting screen to a mode setting screen that is hierarchically adjacent to said first mode setting screen in response to said first manual operation;
   second displaying means for displaying the mode list screen on the display in response to a second manual operation on condition that any mode setting screen is displayed on the display, said second displaying means changing a displayed screen to said mode setting screen without regard to the hierarchical structure in response to said second manual operation;
   means for selecting one of the listed mode setting screens in response to a third manual operation on said mode list screen; and
   third displaying means for displaying a specific mode setting screen corresponding to the selected mode setting screen on the display.

10. A mode setting apparatus as claimed in claim 9, wherein a touch panel key is displayed on the display and the first and second operations are carried out by touching said touch panel key.

11. A mode setting apparatus, comprising:

a plurality of mode setting screens each of which prompts a user to set a function corresponding to a respective mode, said plurality of mode setting screens being arranged in a hierarchical structure;

a mode list screen which lists all mode setting screens available to the user, said mode list screen being independent of the hierarchical structure;

a display for displaying said mode setting screens and said mode list screen, said display displaying only one screen at a time, said one screen being selected from said plurality of mode setting screens and said mode list screen; and a display controller which displays one of said plurality of mode setting screens on the display in response to a first command, said display controller changing a displayed screen from a first mode setting to a mode setting screen that is hierarchically adjacent to said first mode setting screen in response to said first command, said display controller displaying, in response to a second command, said mode list screen on the display, said display controller further displaying, when a mode setting screen is selected on said mode list screen, the specific mode setting screen selected.

12. The mode setting apparatus as claimed in claim 11, further comprising:

a second mode list screen which lists a plurality of mode setting screens including at least one mode setting screens listed on the mode list screen;

wherein the display controller further displays the second mode list screen, and said display controller further displays said mode setting screen corresponding to a mode setting screen selected from said second mode list screen.

13. The mode setting apparatus as claimed in claim 11, further comprising:

a third mode list screen which lists a plurality of mode setting screens including at least one mode setting screen listed on the mode list screen and which is not included in the second mode list screen, wherein the display controller further displays the third mode list screen, and said display controller further displays said mode setting screen corresponding to a mode setting screen selected from said third mode list screen.

14. The mode setting apparatus as claimed in claim 11, wherein the mode setting apparatus is used in a copier, and the mode list screen lists all modes of function of the copier.

15. The mode setting apparatus as claimed in claim 11, wherein the display is a liquid crystal display.

16. A mode setting apparatus comprising:

a switch device;

a plurality of mode setting screens each of which prompts a user to set a function corresponding to each mode;

a first mode list screen which lists a plurality of mode setting screens;

a second mode list screen which lists a plurality of mode setting screens;

a display for displaying said mode setting screens and said mode list screens, said display displaying only one screen at a time, said one screen being a screen selected from said plurality of mode setting screens, said first mode list screen and said second mode list screen; and a display controller which displays, when a mode setting screen is selected on the first or second mode list screens, a specific mode setting screen;

wherein at least one of said plurality of mode setting screens listed on said first mode list screen is also among said plurality of mode setting screens listed on said second mode list screen.

17. The mode setting apparatus as claimed in claim 16, further comprising:

a third mode list screen which lists a plurality of mode setting screens;

wherein at least one of said plurality of mode setting screens listed on said first mode list screen is also among said plurality of mode setting screens listed on said third mode list screen, and wherein said display displays only one screen at a time, said one screen being a screen selected from said plurality of mode setting screens, said first mode list screen, said second mode list screen, and said third mode list screen, and wherein the display controller further displays, when a mode setting screen is selected on the third mode list screen, a specific mode setting screen.

18. The mode setting apparatus as claimed in claim 16, wherein the display is a liquid crystal display.

19. The mode setting apparatus as claimed in claim 16, wherein the switch device is a touch panel switch.

20. A mode setting apparatus which comprises:

a plurality of display screens that are hierarchically divided into strata, said strata including at least a first-level strata having a high-level basic screen and a low-level strata including a plurality of low-level mode setting screens;

at least one medium screen that is independent of said hierarchically divided display screens;

a display for displaying said plurality of display screens and said at least one medium screen, said display displaying only one screen at a time, said one screen being selected from said plurality of display screens and said at least one medium screen;

said plurality of low-level mode setting screens providing for setting operating modes, one low-level mode setting screen being provided for each one of a plurality of operating modes that are capable of being set;

said at least one medium screen including a mode list screen, said mode list screen listing each one of said plurality of low-level mode setting screens;

a display controller for sequentially controlling display of said plurality of display screens and said at least one medium screen;

a first means responsive to an operator input, to switch sequentially between said plurality of display screens according to the display screen hierarchical structure, said first means switching a displayed screen from a first display screen to a display screen that is hierarchically adjacent to said first display screen in response to an operator input;

a second means responsive to an operator input, to switch to a medium screen, including said mode list screen, directly from any display screen, said switch to a medium screen occurring independently of said display screen hierarchical structure; and a third means responsive to an operator input, on condition that said mode list screen is displayed, to switch directly from said mode list screen to a selected one of any of said low-level mode setting screens so that an operating mode may be set, said third means switching a displayed screen from said mode list screen to said selected one of any of said low-level mode setting screens without regard to the hierarchical structure.

21. The mode setting apparatus of claim 20, wherein:

said mode list screen indicates a condition of each operating mode set.

22. The mode setting apparatus of claim 20, wherein:

said plurality of display screens includes a second-level strata including at least one intermediate-level screen, said second-level strata being hierarchically positioned between said first-level strata and said low-level strata.

23. The mode setting apparatus of claim 20 further comprising:

a plurality of help screens, one help screen for each low-level mode screen, each of said plurality of help screens providing information about a respective one of said plurality of operating modes that are capable of being set from said low-level mode setting screens, said plurality of help screens being independent of said hierarchically divided display screens;

said at least one medium screen further including a help list screen, said help list screen listing each one of said plurality of operating modes that are capable of being set for which a corresponding help screen is provided; and a fourth means responsive to an operator input, on condition that said help list screen is displayed, to switch directly from said help list screen to any one of the thus listed help screens;

wherein said display displays said plurality of help screens, said display displaying only one of said plurality of display screens, only one of said at least one medium screen, or only one of said plurality of help screens at a time.

24. The mode setting apparatus of claim 23 further comprising:

a switch device responsive to an operator input, on condition that one of said plurality of help screens is displayed, to switch directly from the thus displayed help screen to said corresponding low-level mode setting screen so that an operating mode may be set.

25. A mode setting apparatus comprising:

a display;

a switch device;

a plurality of mode setting screens each of which prompts a user to set a function corresponding to each mode, said plurality of mode setting screens being arranged according to a hierarchical structure;

a first mode list screen which lists a plurality of mode setting screens;

a second mode list screen which lists a plurality of mode setting screens, each of said first and second mode list screens being independent of the hierarchical structure of said mode setting screens; and a display controller for changing a displayed screen in response to a command;

wherein, in response to said command, when one of said plurality of mode setting screens is displayed on said display, said display controller changing a displayed screen to a second mode setting screen that is hierarchically adjacent to said one of said plurality of mode setting screens displayed;

wherein, in response to said command, when one of said first and second mode setting screens is displayed on said display, said display controller changing a displayed screen to a specific mode setting screen selected from said one of said first and second mode setting screens displayed; and wherein at least one of said plurality of mode setting screens listed on said first mode list screen is also among said plurality of mode setting screens listed on said second mode list screen.

26. An image forming apparatus comprising:

a display;

a plurality of mode setting screens each of which prompts a user to set an image forming condition to each mode, each mode being an operation mode of the image forming apparatus;

a first mode list screen which lists a plurality of mode setting screens;

a second mode list screen which lists a plurality of mode setting screens; and a display controller which displays, when a mode setting screen is selected on the first or second mode list screens, a specific mode setting screen;

wherein at least one of said plurality of mode setting screens listed on said first mode list screen is also among said plurality of mode setting screens listed on said second mode list screen.

* * * * *

UNITED STATES PATENT AND TRADEMARK OFFICE
CERTIFICATE OF CORRECTION

PATENT NO. : 6,075,519
DATED : June 13, 2000
INVENTOR(S) : Toru Okatani, et al.

It is certified that error appears in the above-identified patent and that said Letters Patent is hereby corrected as shown below:

On the title page, item: [75] Inventors:, delete "Miyamoyo", and insert --Miyamoto--.

Column 10, line 51, delete "chancing", and insert --changing--.

Signed and Sealed this

Eighth Day of May, 2001

*Attest:*

NICHOLAS P. GODICI

*Attesting Officer*   *Acting Director of the United States Patent and Trademark Office*